Jan. 13, 1959   J. W. McGUFFEY   2,867,992
CONDENSER COOLING IN MOBILE REFRIGERATION UNIT
Filed Feb. 1, 1956   3 Sheets-Sheet 1
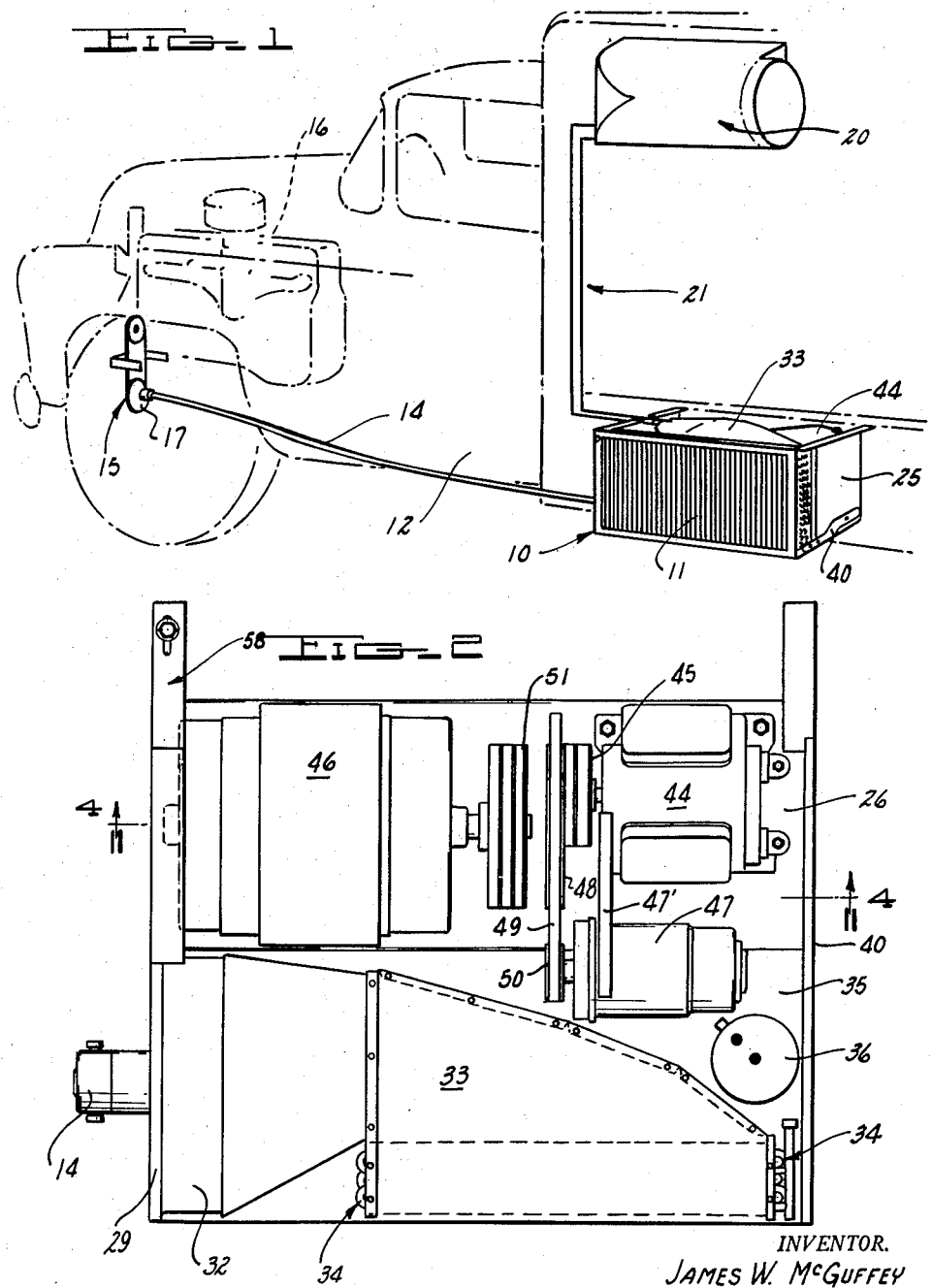
INVENTOR.
JAMES W. McGUFFEY
BY Whittemore, Hulbert &
Belknap
ATTORNEYS Jan. 13, 1959   J. W. McGUFFEY   2,867,992
CONDENSER COOLING IN MOBILE REFRIGERATION UNIT
Filed Feb. 1, 1956   3 Sheets-Sheet 2

INVENTOR.
JAMES W. McGUFFEY
BY Whittemore, Hulbert &
Belknap
ATTORNEYS

Jan. 13, 1959 J. W. McGUFFEY 2,867,992
CONDENSER COOLING IN MOBILE REFRIGERATION UNIT
Filed Feb. 1, 1956 3 Sheets-Sheet 3
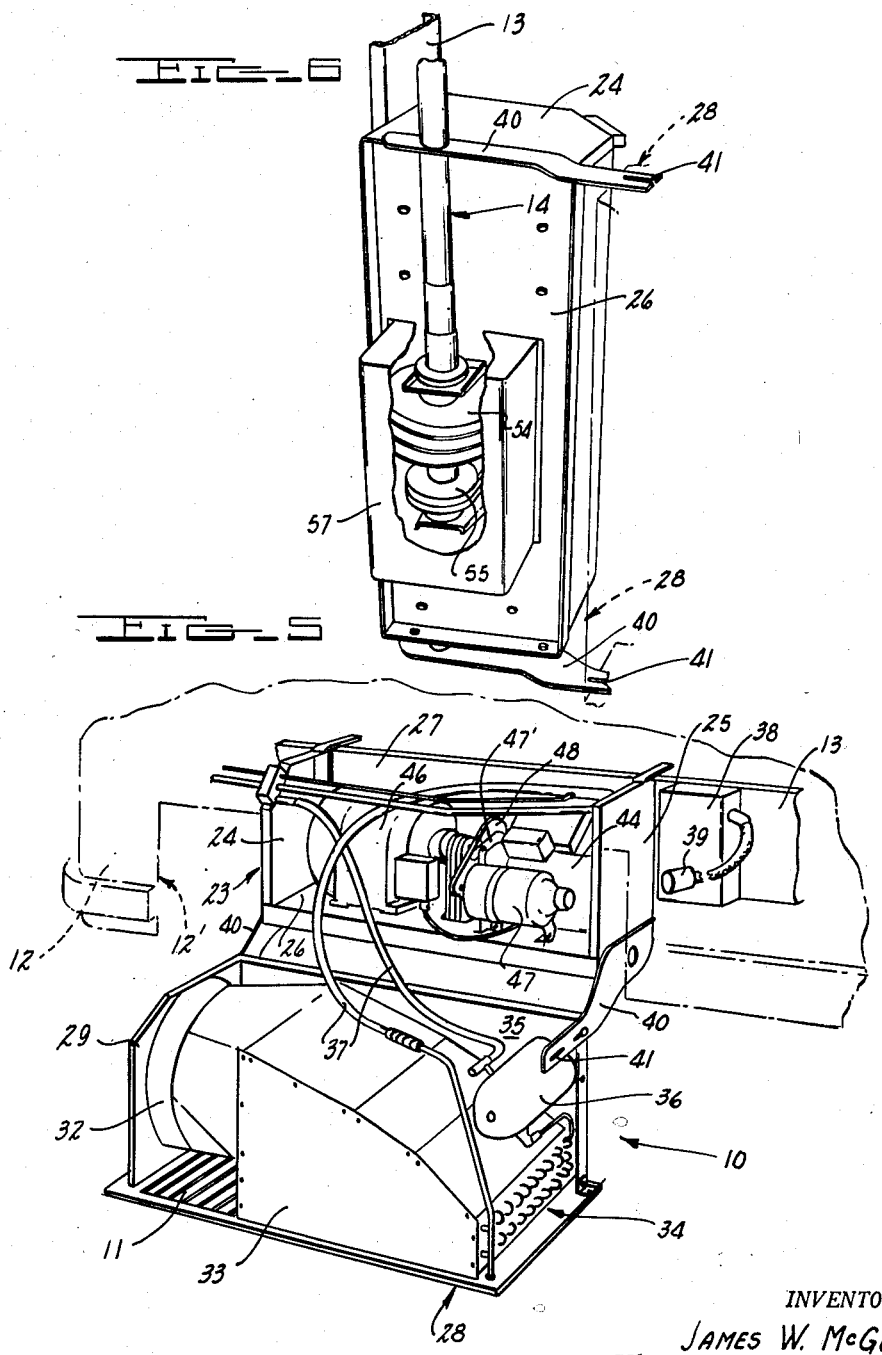
INVENTOR.
JAMES W. McGUFFEY
BY
ATTORNEYS

United States Patent Office 2,867,992
Patented Jan. 13, 1959

2,867,992

CONDENSER COOLING IN MOBILE REFRIGERATION UNIT

James W. McGuffey, Lansing, Mich., assignor to Tranter Manufacturing, Inc., Lansing, Mich., a corporation of Michigan Application February 1, 1956, Serial No. 562,699

11 Claims. (Cl. 62—241)

The present invention relates to an improved and highly compact condenser, compressor and drive unit for a mobile refrigeration system, as a refrigerator truck or trailer installation. Such an installation constitutes the subject matter of a copending application fo Orton S. McGuffey and James W. McGuffey, Serial No. 533,618, filed September 12, 1955.

It is a general object of the present invention to provide a unit of this type which, while affording adequate condenser capacity, hence rather substantial space for its condenser component, as well as associated compressor, compressor and fan driving instrumentalities, etc., will still occupy a minimum overall space on the truck or trailer body, from the chassis of which it is suspended in an inwardly retracted position. More particularly, the unit must provide adequate space for shafting and belt-pulley provisions to drive the compressor, condenser circulating fan, and the like, which shafting is, in accordance with the invention (and is also the case in the copending application identified above) driven by a flexible shaft connection to the engine drive shaft of the vehicle.

It is, moreover, an object of the invention to provide a mobile refrigeration unit of the sort described, in which ample intake space is available for the entry of cold air, without undesirable baffling. All of the components of the actual refrigeration apparatus, with the exception of the evaporator, are mounted in the skirt of the truck or trailer body, which is desirable in view of the fact that many operators object to the mounting of the condenser of the apparatus at the nose of the truck or trailer body. Yet in accordance with the invention an excellent air flow past the condenser coil is obtained, due to a combined ram and aspiration action at a forwardly facing intake opening of the condenser housing and a laterally outwardly facing, louvered discharge opening, respectively.

Still further, and as an important objective of the invention, a mobile unit is provided, in which the condenser component thereof is movably mounted in relation to the remainder of the unit, in which the other operating components are housed, so as to permit ready access to the same for servicing from the exterior of the vehicle. In accordance with the invention, this is accomplished by mounting the condenser on a support which is pivotally connected to the remaining housing structure of the unit, so that the condenser may be swung outwardly and downwardly in relation to the side of the vehicle body, exposing the compressor and driving agencies mounted within the housing of the unit.

Generally, it is an object to provide an improved unit which imposes a minimum horse power drag from its fan and other driven means on the engine or standby motor driving provisions for the refrigerating system. In this connection, the invention also affords a unit which is of extremely light weight, inexpensive to produce and easily and quickly handled in installation and servicing.

The foregoing as well as other objects of the invention will become more apparent as this description proceeds, especially in connection with the accompanying drawings, in which:

Fig. 1 is a fragmentary view of a commercial refrigerated vehicle, outlined with its engine, etc. in dot-dash line, to which the improved unit is applied;

Fig. 2 is a top plan view of the unit as shown in Fig. 1;

Fig. 5 is a perspective view of the unit as opened up for inspection, servicing, or the like, the vehicle body being shown in dot-dash line; and Fig. 6 is a fragmentary perspective view, partially broken away, of a portion of the housing structure of the improved unit, showing in particular its engine connected driving provisions.

Figure 3:
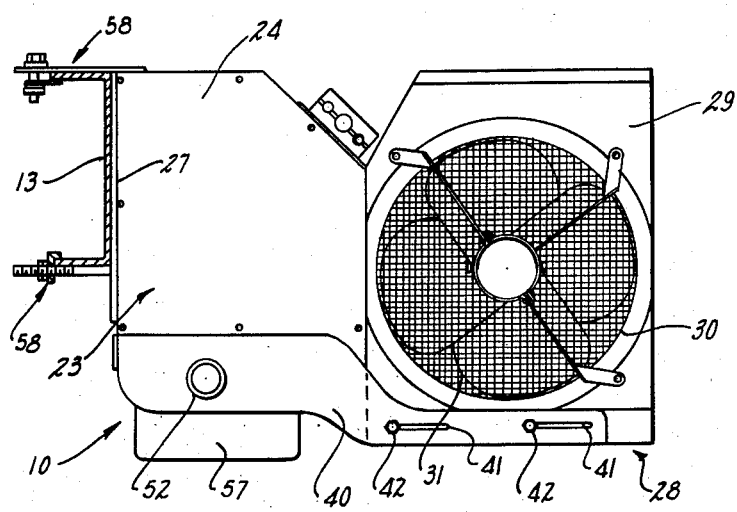
Fig. 3 is a view in front elevation of the unit.

As illustrated generally in Fig. 1, the improved compressor, condenser, driver unit of the invention is generally designated 10, and is mounted with an external side, louvered panel 11 thereof disposed in flush relation with a side surface of the body of a commercial truck or like vehicle, generally designated 12. The body structure is provided with a side opening 12' (Fig. 5) adjacent the bottom thereof to receive a movable part of the unit 10 in this relation. As shown in Figs. 3, 5 and 6, the chassis channel 13 of the vehicle serves to mount the unit 10. The unit 10 is, as illustrated and described in the copending application of McGuffey et al. referred to above, drivingly connected through an elongated forwardly extending flexible cable 14 with a clutch assembly 15, which is in turn drivingly connected to the crank shaft of the vehicle engine 16, as in the improved fashion also shown in the identified McGuffey et al. application.

The present invention does not deal particularly with the driving clutch assembly 15, per se; however, it comprises generally a magnetic or electrical clutch housing 17 sustained on a rigid forward chassis part 18 by a resilient, cushioned mount bracket 19, or the like.

The reference numeral 20 (Fig. 1) generally designates an evaporator or blower unit of the refrigerating system, connected by fluid flow and power transmission lines, as shown in the McGuffey et al. application, with the unit 10. Such lines are only schematically illustrated, and are generally designated 21. Their connections to the respective operating instrumentalities of the condenser compressor drive means of the unit 10 (to be described) and to the circulatory and coil provisions of the unit 20 (not shown) will be conventional.

However, the evaporator or blower unit 20 is preferably of the improved shrouded housing, fan and coil construction which is the subject matter of my copending application, Serial No. 558,059 filed January 9, 1956. This features a fan which draws circulating air past the evaporator coil and out into the interior of the truck body. The unit 20 will be appropriately mounted to a side of that body.

As best shown in Figs. 3, 5 and 6, an inner sheet metal housing 23 of the improved unit 10 is constituted by imperforate front and rear panels 24, 25, respectively, an apertured bottom panel 26 and an inner upright panel 27, rigidly connected together, the top and outer portions of the housing 23 being open, as illustrated in Fig. 5. A further, condenser mounting housing, generally designated 28, is provided by the outer louvered panel 11, referred to above, and a forward air intake panel 29 having a central fan aperture 30 of substantial area. This aperture is covered by appropriate protective meshing, and a fan 31 is rotatably mounted in the aperture, and in the intake throat 32 (Figs. 2 and 5) of a shrouded condenser housing 33. This housing and related coil structure, generally designated 34, may also be of the type illustrated in the co-pending application of James W. McGuffey, Serial No. 558,059, identified above. The housing 33 and its coil 34 are fixedly mounted on the louvered air exhaust panel 11 in an appropriate way, with a discharge opening of the housing 33 exposed outwardly to the same.

The intake throat 32 of the housing is appropriately secured to the forward housing panel 29. A bottom panel 35 of the condenser housing structure 28 serves as a support for the receiver 36. Appropriate and necessary fluid circulating provisions, including flexible conduitry 37, operatively connect the condenser coil with other components of the refrigerating system, and its fan 31 is also energized electrically through conventional wiring provisions (not shown). In this connection, a suitable electrical regulator 38 is fixedly mounted on the vehicle chassis 13, as shown in Fig. 5, and has a cable equipped with a releasable coupling 39, for a purpose not germane to the present invention.

The fixed, chassis-mounted housing 23 of the improved unit 10 carries a pair of rigid, outwardly projecting bracket plates 40 at its opposite ends, each of which is provided with a pair of elongated, horizontally extending slots 41 receiving mounting and pivoting bolts or studs 42, as shown in Figs. 3 and 5, by which the outer condenser housing structure 28 is secured in place in relation to housing 23, or is permitted to be swung outwardly and downwardly, as shown in Fig. 5, for servicing of the condenser component or the remainder of the operating structure within housing 23. This is done by simply releasing the outermost bolts 42, whereupon the structure 28 may be shifted outwardly or swung downwardly to the exposed position shown in Fig. 5 of the drawings.

In general, the agencies mounted within the fixed inner housing 23 are similar to those shown and described in the McGuffey et al. application, Serial No. 533,618, filed September 12, 1955, mentioned above, and are correspondingly operated and controlled. The improvement of the present invention resides in the suitability of the unit 10 to adequately house the same in a minimum overall space and still accommodate the condenser housing 33 and associated structure. In this connection, adequate capacity must be afforded for an operation in which a compressor, to be referred to, is operated at speeds from 450 to 2,500 R. P. M.

Figure 4:
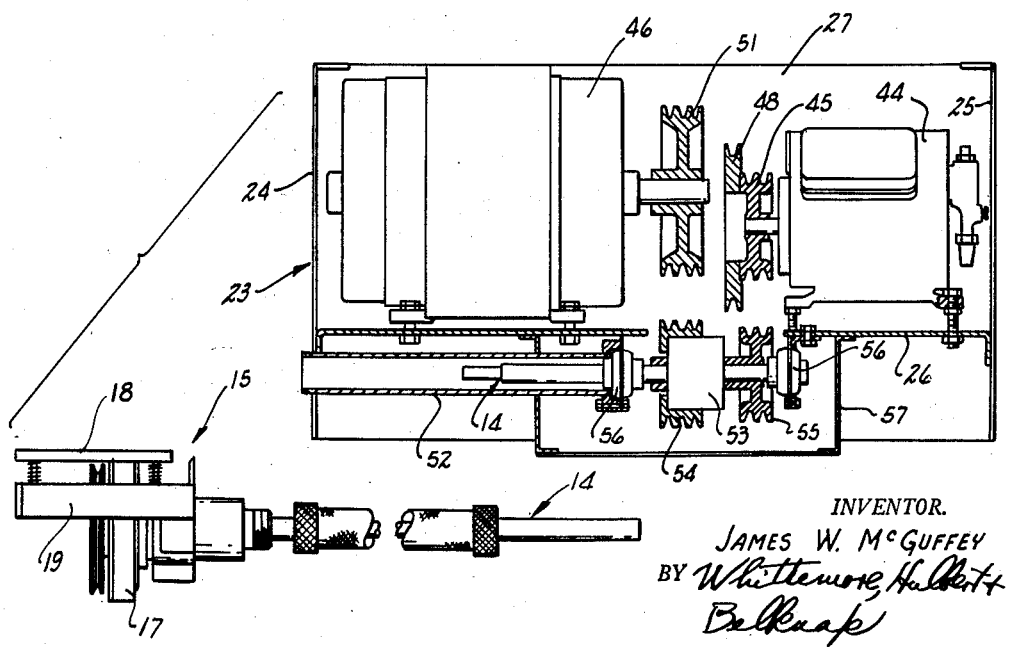
Fig. 4 is a view in vertical section along broken line 4—4 of Fig. 2, a portion of the flexible shaft connection to drive the latter also being shown.

As shown in Figs. 2, 4 and 5, the operating structure referred to comprises a compressor 44 mounted on the bottom panel 26 of housing 23. Its shaft carries a multiple sheave pulley 45 by which the compressor may be engine driven, or driven by a standby motor 46, also mounted on the bottom panel 26. A generator 47 is secured to the compressor 44 in outwardly spaced relation thereto, as by an adjustable strap connector 47', and will occupy a portion of the interior of the outer housing structure 28 when the latter is operatively positioned in relation to inner housing 23, as shown in Fig. 2 of the drawings. A pulley 48 on the compressor shaft is drivingly connected by belt 49 with a pulley 50 on the generator shaft for this purpose. The shaft of the motor 46 carries a multiple sheave pulley 51.

The flexible shafting 14 extends through a rigid sleeve 52 carried by bottom housing panel 26 (Fig. 4) and is drivingly coupled with an overrunning clutch 53 which has a multiple sheave pulley 54 thereon in alignment with the motor pulley 51. Clutch 53 is also adapted to drive a multiple sheave pulley 55 in alignment with the compressor driving pulley 45. The clutch and pulley provisions referred to are carried in suitable bearing provisions 56, and are enclosed by a removable bottom housing shell 57, as illustrated in Fig. 6. Necessary electrical wiring provisions have been omitted for the sake of simplicity and clarity but their nature will be obvious to those skilled in the art.

The unit 10 may be releasably clamped on the vehicle chassis 13 by the use of a releasable hooking strap and threaded clamp stud structure or the like, as shown in Fig. 3 and generally designated 58.

With the unit 10 thus mounted, its operation, insofar as the production of refrigeration is concerned, is as illustrated and described in the McGuffey et al. application, Serial No. 533,618. That is, while the vehicle engine 16 is in operation, the flexible shafting 14 will drive the pulley 55, and thus drive compressor 44 and the associated electrical generator 47. The overrunning clutch 53 permits this without loading motor 46 through pulleys 54 and 51. During standby periods motor 46 will be electrically energized to drive the compressor through clutch 53.

The extreme compactness of the unit 10 is perhaps best shown in Fig. 2, and the convenience which it affords for inspection and servicing appears clearly in Fig. 5. Required condenser and compressor capacity is present in a minimum space. Ample air intake and exhaust opening is afforded, and the assembly constituting the unit 10 as a whole can be fabricated inexpensively and in a very light weight, indeed.

Notwithstanding the retracted position of the unit 10 in relation to the skirt of the vehicle body, an excellent air circulatory action is afforded through the condenser housing 33. Cold air enters its forwardly facing intake aperture 30, at which the fan 31 is disposed, with a desirable ram effect when the vehicle is in motion. The fan operates with maximum air handling capacity due to the condensed nature of the incoming air; moreover, the louvers 11 at the laterally outwardly facing discharge opening of the housing, adjacent which the condenser coil 34 is disposed, produce an aspiration effect which enhances the condenser's capacity to handle air, in combination with the ram action at the intake. The condenser structure can readily balance the capacity of a 4½ horse power compressor, in an arrangement as described.

Thus it is seen that a very compact and readily serviceable package mount is afforded for the high side of the refrigeration system, with maximum efficiency of operation, notwithstanding the relatively retracted or withdrawn position of the package, as compared with the placement of certain components of the system at the nose of the truck or trailer body, the theoretically optimum position.

What I claim as my invention is:

1. In refrigerating apparatus for a truck body or the like possessing an upright side skirt portion, a housing structure adapted to be disposed substantially within the outline of said body at said skirt portion, said structure comprising a fixed support having an operating instrumentality mounted thereon, and a condenser unit adjustably mounted on said support laterally outwardly of said instrumentality for movement to a position outwardly of said skirt portion, said condenser unit comprising a unitary casing defining a confined path of air flow completely shielded from said instrumentality from a forward intake opening to a lateral discharge opening substantially flush with said skirt portion, a fan within said casing adjacent said forward intake opening, and a coil within said casing adjacent said lateral discharge opening, said intake opening being exposed forwardly of said skirt portion when said condenser unit is in position inwardly of said skirt portion.

2. In refrigerating apparatus for a truck body or the like possessing an upright side skirt portion, a housing structure adapted to be disposed substantially within the outline of said body at said skirt portion, said structure comprising a fixed support having a compressor and a further operating instrumentality mounted thereon, and a condenser unit pivotally mounted on said support laterally outwardly of said compressor and instrumentality for movement to a position outwardly of said skirt portion, said condenser unit comprising a unitary casing defining a confined path of air flow completely shielded from said compressor and instrumentality from a forward intake opening to a lateral discharge opening substantially flush with said skirt portion, a fan in said housing adjacent said forward intake opening, and a coil adjacent said lateral discharge opening, said intake opening being exposed forwardly of said skirt portion when said condenser unit is in position inwardly of said skirt portion.

3. A condenser, compressor and power unit for installation on a refrigerated truck or like mobile structure, comprising a housing having fixed and movable parts articulated for relative swinging movement of the latter part in one direction to expose the interior of said housing, compressor and power supply devices mounted within said fixed housing part in a compact relation to one another, and a condenser assembly mounted on said movable part to occupy substantially the remainder of the interior of said housing when said parts are operatively connected upon opposite swinging movement of said movable part, said assembly comprising a cooling coil, a fan, a unitary shroud encasing said coil and fan and defining a cool air circulating path past said coil which is separate, distinct and shielded from the remainder of said housing interior, said shroud having a forwardly facing air intake opening and a laterally facing discharge opening adjacent said coil.

4. A condenser, compressor and power unit for installation of a refrigerated truck or like mobile structure, comprising a housing having fixed and movable parts articulated for relative swinging movement of the latter part in one direction to expose the interior of said housing, compressor and power supply devices mounted within said fixed housing part in a compact relation to one another, and a condenser assembly mounted on said movable part to occupy substantially the remainder of the interior of said housing when said parts are operatively connected upon opposite swinging movement of said movable part, said assembly comprising a cooling coil, a fan, a unitary shroud encasing said coil and fan and defining a cool air circulating path past said coil which is separate, distinct and shielded from the remainder of said housing interior, said shroud having a forwardly facing air intake opening adjacent and forwardly of said fan and a laterally facing discharge opening adjacent and laterally outwardly of said coil.

5. An operating unit for the refrigeration system of a truck or like vehicle, comprising a fixed support adapted to be rigidly mounted on said vehicle inwardly of the body outline of the latter, a compressor and operating instrumentalities mounted on said support, a movable support pivotally mounted on said fixed support to swing outwardly thereof and of said body outline, and a condenser assembly operatively connected with said compressor and mounted on said movable support, whereby said assembly is swingable to expose said compressor and operating instrumentalities for access, said condenser assembly including a unitary casing movable therewith and provided with an air intake aperture facing and opening forwardly of the vehicle and with an exhaust opening facing to a side of the vehicle, a fan adjacent said intake aperture, and a coil adjacent said exhaust opening, said unitary casing enclosing said fan and coil and defining a cool air circulating path past the latter which is shielded from said compressor and operating instrumentalities.

6. An operating unit for the refrigeration system of a truck or like vehicle, comprising a housing structure including a fixed support adapted to be rigidly mounted on said vehicle inwardly of the body outline of the latter, a compressor and operating instrumentalities mounted on said support within said housing structure, a movable support pivotally mounted on said fixed support to swing outwardly thereof and of said body outline, and a condenser assembly operatively connected with said compressor and mounted on said movable support, whereby said assembly is swingable to expose said compressor and operating instrumentalities for access, said condenser assembly including a unitary casing movable therewith and provided with an air intake aperture facing and opening forwardly of the vehicle and with an exhaust opening facing to a side of the vehicle, a fan adjacent said intake aperture, and a coil adjacent said exhaust opening, said unitary casing enclosing said fan and coil and defining a cool air circulating path past the latter which is separate and distinct from said housing structure and shielded from said compressor and operating instrumentalities.

7. An operating unit for the refrigeration system of a truck or like vehicle, comprising a housing structure including a fixed support adapted to be rigidly mounted on said vehicle inwardly of the body outline of the latter, a compressor and operating instrumentalities mounted on said support within said housing structure, a movable support pivotally mounted on said fixed support to swing outwardly thereof and of said body outline, and a condenser assembly operatively connected with said compressor and mounted on said movable support, whereby said assembly is swingable to expose said compressor and operating instrumentalities for access, said condenser assembly including a unitary casing movable therewith and provided with an air intake aperture facing and opening forwardly of the vehicle and with a louvered exhaust opening facing to a side of the vehicle and disposed flush with the vehicle body when said fixed and movable supports are in operative condition, a fan adjacent said intake aperture, and a coil adjacent said exhaust opening, said unitary casing enclosing said fan and coil and defining a cool air circulating path past the latter which is separate and distinct from said housing structure and shielded from said compressor and operating instrumentalities.

8. A condenser, compressor and power unit for installation on a refrigerated truck or like mobile structure, comprising a housing having fixed and movable parts connected for movement of the latter part in one direction to expose the interior of said housing, compressor and power supply devices mounted within said fixed housing part in a compact relation to one another, and a condenser assembly mounted on said movable part to occupy substantially the remainder of the interior of said housing when said parts are operatively connected upon opposite swinging movement of said movable part, said assembly comprising a cooling coil, a fan, a unitary shroud encasing said coil and fan and defining a cool air circulating path past said coil which is separate, distinct and shielded from the remainder of said housing interior, said shroud having a forwardly facing air intake opening adjacent and forwardly of said fan and a laterally facing discharge opening adjacent and laterally outwardly of said coil.

9. Apparatus adapted to be mounted on a vehicle for refrigerating an enclosed body thereof, comprising a compressor unit having means adapted to be drivingly connected with a part of said vehicle to drive the compressor unit at variable output rate in response to variations in the speed of the vehicle; and an air circulatory condenser unit adapted to be mounted in its entirety in a zone adjacent one side of said body, in a manner whereby the air circulating capacity of said condenser is influenced by ram and aspirative actions at its intake and discharge, respectively, in accordance with the speed of said vehicle, and a rise in compressor output rate is thereby accompanied by a rise in the air circulating capacity of said condenser, said condenser unit including a fully shrouded housing having an air intake in said zone opening forwardly of said body and substantially unobstructed by said vehicle or body, a discharge in said zone opening outwardly of said side of said body for a rearward discharge of air, and a coil in said housing, said housing defining an air circulating path past said coil which is shielded from external disturbance between said intake and discharge; and means to mount said condenser and compressor in units in said zone with said compressor unit located inwardly of said housing.

10. Apparatus adapted to be mounted on a vehicle for refrigerating an enclosed body thereof comprising a compressor unit having means adapted to be drivingly connected with a part of said vehicle to drive the compressor unit at variable output rate in response to variations in the speed of the vehicle; and an air circulatory condenser unit adapted to be mounted in its entirety in a zone adjacent and beneath one side of said body, in a manner whereby the air circulating capacity of said condenser is influenced by ram and aspirative actions at its intake and discharge, respectively, in accordance with the speed of said vehicle, and a rise in compressor output rate is thereby accompanied by a rise in the air circulating capacity of said condenser, said condenser unit including a fully shrouded housing having an air intake in said zone opening forwardly of said body and substantialy unobstructed by said vehicle or body, a discharge opening in said zone provided with louvers inclined to the rear and outwardly of said side of said body for a side and rearward discharge of air, and a coil in said housing, said shrouded housing defining an air circulating path past said coil which is shielded from external disturbance between said intake and discharge; and means to mount said condenser and compressor units in said zone.

11. Apparatus adapted to be mounted on a vehicle for refrigerating an enclosed body thereof, comprising a compressor unit having means adapted to be drivingly connected with a part of said vehicle to drive the compressor unit at variable output rate in response to variations in the speed of the vehicle; and an air circulatory condenser unit adapted to be mounted in its entirety in a zone adjacent and beneath one side of said body, in a manner whereby the air circulating capacity of said condenser is influenced by ram and aspirative actions at its intake and discharge, respectively, in accordance with the speed of said vehicle, and a rise in compressor output rate is thereby accompanied by a rise in the air circulating capacity of said condenser, said condenser unit including a fully shrouded housing having an air intake in said zone opening forwardly of said body and substantially unobstructed by said vehicle or body, a discharge opening in said zone provided with louvers inclined to the rear and outwardly of said side of said body for a side and rearward discharge of air, a fan located in said housing adjacent said air intake, and a coil in said housing adjacent said discharge, said shrouded housing defining an air circulating path past said coil which is shielded from external disturbance between said intake and discharge; and means to mount said condenser and compressor units in said zone with said compressor unit located inwardly of said housing.

References Cited in the file of this patent

UNITED STATES PATENTS

| | | |
|---|---|---|
| 2,099,747 | Melcher | Nov. 23, 1937 |
| 2,406,241 | Morrison | Aug. 20, 1946 |
| 2,480,510 | Roper | Aug. 30, 1949 |
| 2,696,084 | Kirkpatrick | Dec. 7, 1954 |
| 2,699,043 | Kramer | Jan. 11, 1955 |
| 2,758,453 | Kernjack | Aug. 14, 1956 |
| 2,780,928 | Bullock | Feb. 12, 1957 |

FOREIGN PATENTS

| | | |
|---|---|---|
| 19,575 | Great Britain | Aug. 11, 1910 |